US011580753B2

(12) United States Patent
Popov et al.

(10) Patent No.: US 11,580,753 B2
(45) Date of Patent: *Feb. 14, 2023

(54) LICENSE PLATE DETECTION AND RECOGNITION SYSTEM

(71) Applicant: Nortek Security & Control LLC, Carlsbad, CA (US)

(72) Inventors: Ilya Popov, Nizhny Novgorod (RU); Dmitry Yashunin, Nizhny Novgorod (RU); Semen Budenkov, Nizhniy Novgorod (RU); Krishna Khadloya, San Jose, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/317,505

(22) Filed: May 11, 2021

(65) Prior Publication Data

US 2021/0264168 A1 Aug. 26, 2021

Related U.S. Application Data

(63) Continuation of application No. 16/272,556, filed on Feb. 11, 2019, now Pat. No. 11,030,466.

(Continued)

(51) Int. Cl.
*G06K 9/00* (2022.01)
*G06V 20/56* (2022.01)
(Continued)

(52) U.S. Cl.
CPC ........... *G06V 20/56* (2022.01); *G06K 9/6267* (2013.01); *G06T 5/002* (2013.01); *G06T 5/20* (2013.01); *G06V 20/625* (2022.01); *G06V 30/10* (2022.01)

(58) Field of Classification Search
CPC ............ G06K 9/4628; G06K 9/00771; G06K 9/3233; G06K 9/6271; G06K 9/6256;
(Continued)

(56) References Cited

U.S. PATENT DOCUMENTS

| 4,567,609 A | 1/1986 | Metcalf |
| 6,339,651 B1 * | 1/2002 | Tian ..................... G06V 30/153 340/5.1 |

(Continued)

FOREIGN PATENT DOCUMENTS

| CN | 107220638 A | 9/2017 |
| CN | 108091141 A | 5/2018 |
| CN | 104299006 B | 11/2018 |

OTHER PUBLICATIONS

"U.S. Appl. No. 16/272,556, Final Office Action dated Dec. 2, 2020", 14 pgs.

(Continued)

*Primary Examiner* — Alex Kok S Liew
(74) *Attorney, Agent, or Firm* — Schwegman Lundberg & Woessner, P.A.

(57) ABSTRACT

A license plate detection and recognition system receives training data comprising images of license plates. The system prepares ground truth data from the training data based predefined parameters. The system trains a first machine learning algorithm based on the ground truth data to generate a license plate detection model. The license plate detection model is configured to detect one or more regions in the images. The one or more regions contains a candidate for a license plate. The LPDR system generates a bounding box for each region. The LPDR system trains a second machine learning algorithm based on the ground truth data and the license plate detection model to generate a license plate recognition model. The license plate recognition model (Continued)

generates a sequence of alphanumeric characters with a level of recognition confidence for the sequence.

18 Claims, 13 Drawing Sheets

Related U.S. Application Data

(60) Provisional application No. 62/629,031, filed on Feb. 11, 2018.

(51) Int. Cl.
*G06T 5/20* (2006.01)
*G06T 5/00* (2006.01)
*G06K 9/62* (2022.01)
*G06V 20/62* (2022.01)
*G06V 30/10* (2022.01)

(58) Field of Classification Search
CPC .......... G06K 2209/15; G06K 9/6268; G06K 9/00664; G06K 9/00785; G06K 9/3258; G06K 9/6218; G06K 9/627; G06K 9/6273; G06K 9/628; G06K 2209/23; G06K 9/4671; G06K 2209/01; G06N 3/08; G06N 3/0454; G06N 20/00; G06N 20/20; G06N 3/10; G06N 5/003; G06N 5/022; G06N 5/025; G06N 7/005; G06N 7/06; G06N 3/084; G06N 3/04; G06N 3/063; G06N 3/02; G06N 3/0445; G06N 3/0481; G06N 5/046
See application file for complete search history.

(56) References Cited

U.S. PATENT DOCUMENTS

| | | |
|---|---|---|
| 7,447,362 B2 | 11/2008 | Lev |
| 9,158,995 B2 | 10/2015 | Rodriguez-Serrano et al. |
| 9,785,855 B2 | 10/2017 | Gordo Soldevila et al. |
| 10,133,921 B2 | 11/2018 | Cervin et al. |
| 10,229,314 B1 | 3/2019 | Mitchell et al. |
| 2006/0187305 A1 | 8/2006 | Trivedi et al. |
| 2013/0013631 A1 | 5/2013 | Hofman et al. |
| 2013/0129151 A1 | 5/2013 | Rodriguez et al. |
| 2013/0294652 A1 | 11/2013 | Fan et al. |
| 2014/0056520 A1 | 2/2014 | Rodriguez Serrano |
| 2014/0201213 A1 | 7/2014 | Jackson et al. |
| 2014/0270350 A1 | 9/2014 | Rodriguez-Serrano et al. |
| 2014/0307923 A1 | 10/2014 | Johansson |
| 2015/0049914 A1 | 2/2015 | Alves |
| 2016/0125613 A1 | 5/2016 | Shustorovich et al. |
| 2016/0300119 A1 | 10/2016 | Silva et al. |
| 2017/0300786 A1 | 10/2017 | Gope et al. |
| 2017/0372161 A1 | 12/2017 | Almeida et al. |
| 2018/0253616 A1 | 9/2018 | Johnson et al. |
| 2018/0300578 A1 | 10/2018 | Wilbert et al. |
| 2019/0050654 A1 | 2/2019 | Payne-Short et al. |
| 2019/0251369 A1 | 8/2019 | Popov et al. |

OTHER PUBLICATIONS

"U.S. Appl. No. 16/272,556, Non Final Office Action dated Jun. 29, 2020", 22 pgs.

"U.S. Appl. No. 16/272,556, Notice of Allowance dated Feb. 10, 2021", 12 pgs.

"U.S. Appl. No. 16/272,556, Response filed Feb. 2, 2021 to Final Office Action dated Dec. 2, 2020", 11 pgs.

"U.S. Appl. No. 16/272,556, Response filed Sep. 29, 2020 to Non Final Office Action dated Jun. 29, 2020", 13 pgs.

Xie, "A New CNN-Based Method for Multi-Directional Car License Plate Detection", IEEE, (2018).

U.S. Appl. No. 16/272,556, filed Feb. 11, 2019, License Plate Detection and Recognition System.

\* cited by examiner

LICENSE PLATE DETECTION AND RECOGNITION SYSTEM

CROSS-REFERENCE TO RELATED APPLICATIONS

This application is a continuation of U.S. Non-Provisional application Ser. No. 16/272,556, filed Feb. 11, 2019, which claims the benefit of priority of U.S. Provisional Application No. 62/629,031, filed Feb. 11, 2018, which are herein incorporated by reference in their entirety.

BACKGROUND

The present application generally relates to the field of license plate detection and recognition, and in particular, relates to methods and systems for forming and using an efficient and accurate License Plate Detection and Recognition (LPDR) system.

License plate detection and recognition (LPDR) is a technology that generally uses license plate detection approaches followed by optical character recognition (OCR) on images to read vehicle registration plates to identify the license plate identifiers. LPDR systems can be used in many day-to-day activities. For example, the LPDR systems may improve user's experience by allowing them to pass toll booths non-stop, by automatically determining in/out timestamps of vehicles in parking lots, and by automatically determining vehicles of condominium members for automatic gates opening. The LPDR systems are further helpful in finding a stolen vehicle by searching for license plates detected by police car cameras.

Presently, most LPDR systems have been developed using pure computer vision-based techniques such as morphology-based character segmentation with machine learning based Optical Character Recognition (OCR). However, these computer vision-based techniques may properly operate in simple situations: a license plate is clearly and fully visible, the orientation of the license plate from a horizontal line does not exceed 25 degrees, there is no or minimal tilt, and a minimal size of the license plate is greater than 100 pixels in width. The accuracy of existing LPDR systems may be compromised in complex situations: when there are shadows, noise, and dust over the license plate. Furthermore, existing LPDR systems may not provide accurate results when the license plate is partially overlapped with other plate, include stacked letters, display low contrast data, and the data in the license plate is poorly segmentable.

Moreover, for live video data detected by police car or traffic cameras, running a modern real-time license recognition model is computationally expensive and usually requires powerful hardware such as a Graphical Processing Module (GPU). Many a times, the real-time license recognition has to be performed by edge devices that lack GPU and have limited processor capacity, and are highly constrained by weight and power availability.

In view of the above, there is a need for a license plate recognition method and system that has an improved accuracy in the above-mentioned complex situations. The license plate recognition method and system should be able to generate accurate results when the license plate include stacked letters, display low contrast data, and the data therein is poorly segmentable. The LPDR system should allow for smooth object-recognition output on less powerful hardware such as edge devices and small computers that lack Graphic processing modules (GPUs), so as to save computational resources and electricity costs, and therefore achieve longer operating time, especially on battery operated portable devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
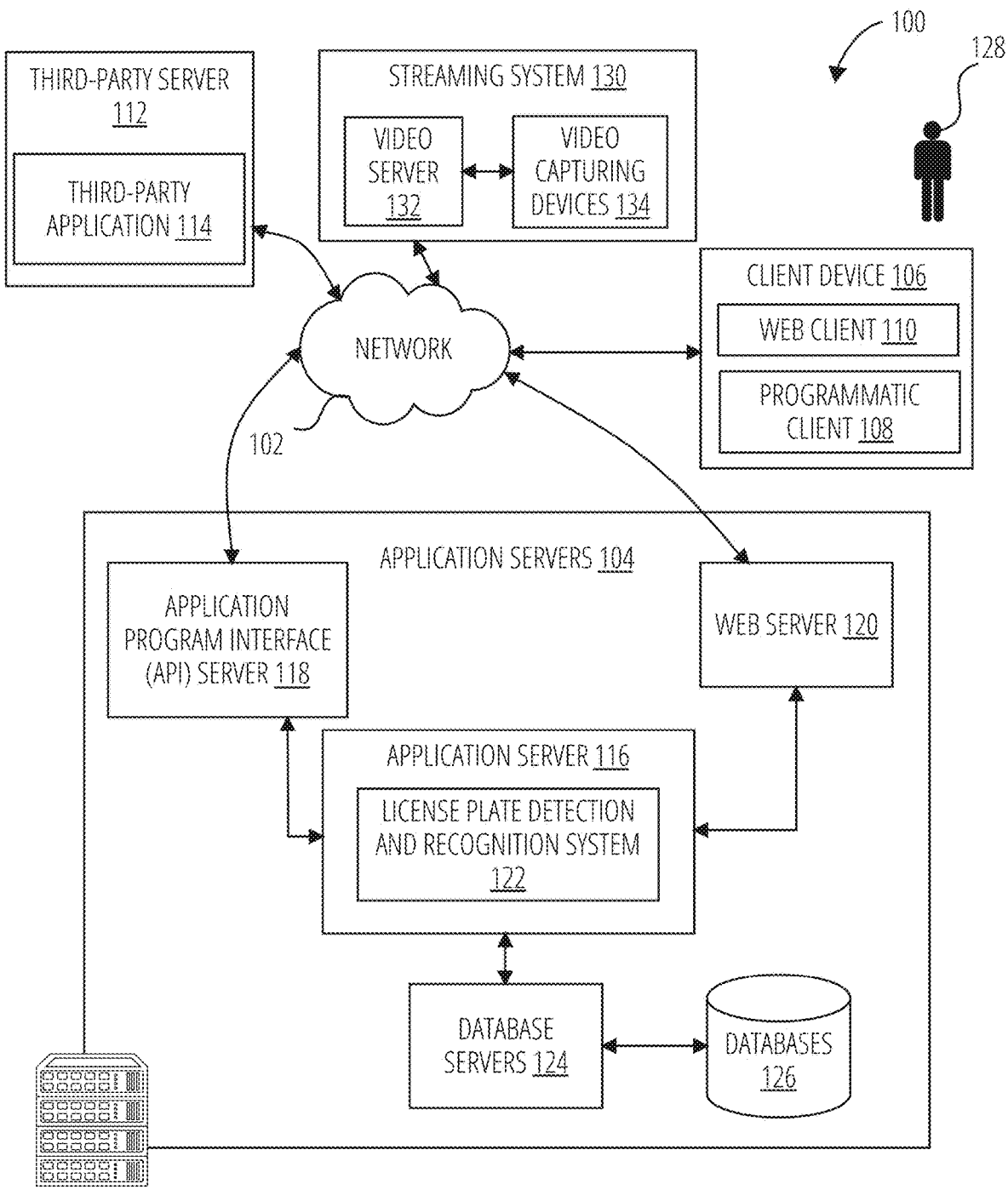
FIG. 1 is a diagrammatic representation of a networked environment in which the present disclosure may be deployed, in accordance with some example embodiments.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

Example methods and systems are directed to a detection and recognition license plate system. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The present application describes devices/machines/systems that identify a vehicle license plate (LP) in an image and recognize the characters in the license plate. The presently described system provides a high accuracy solution for license plate detection and recognition (LPDR) system. In one example embodiment, the LPDR system includes two separate LP detection and recognition modules to allow to split processing. For example, the detection part may be performed on one device/platform while the recognition part may be performed another device/platform. The LP detection and recognition modules may be built on top of a Convolutional Neural Network (CNN) model, and allow for control of performance/accuracy of detection and recognition. In one example embodiment, the LPDR system is based on a combination of multiple deep learning neural network sub-systems for detection and optical character recognition, and enables higher quality, effectiveness and accuracy, high performance and scalability.

The presently described LPDR system can handle more complex cases including processing of partially visible LPs, LPs with stacked letters, low contrast data, and poorly segmentable LPs, among other poor visible conditions. In one example, the LPDR system allows to perform accurate recognition for single, multi-row and stacked license plates. In another example, the LPDR system recognizes stacked letters in license plates.

In one example embodiment, the present application describes a method for detecting and recognizing license plates with a LPDR system. The LPDR system receives training data comprising images of license plates; prepares ground truth data from the training data based predefined parameters; trains a first machine learning algorithm based on the ground truth data to generate a license plate detection model. The license plate detection model is configured to detect one or more regions in the images. The one or more regions contains a candidate for a license plate. The LPDR system generates a bounding box for each region. The LPDR system trains a second machine learning algorithm based on the ground truth data and the license plate detection model to generate a license plate recognition model. The license plate recognition model generates a sequence of alphanumeric characters with a level of recognition confidence for the sequence.

FIG. 1 is a diagrammatic representation of a network environment 100 in which some example embodiments of the present disclosure may be implemented or deployed.

One or more application servers 104 provide server-side functionality via a network 102 to a networked user device (in the form of a client device 106 of the user 128) and a streaming system 130. A web client 110 (e.g., a browser) and a programmatic client 108 (e.g., an "app") are hosted and execute on the client device 106. The client device 106 can communicate with a streaming system 130 and application servers 104 via the network 102 or via other wireless or wired means. The streaming system 130 comprises a video server 132 and video capturing devices 134. The video capturing devices 134 generate image/video data and provides the image/video data to the video server 132.

An Application Program Interface (API) server 118 and a web server 120 provide respective programmatic and web interfaces to application servers 104. A specific application server 116 hosts a license plate detection and recognition system 122 that operates with the application server 116. In one example, the license plate detection and recognition system 122 receives video or image data from the streaming system 130, detects license plates in the images or video frames from the streaming system 130, and recognizes the alphanumeric identifiers in the detected license plates. The operations performed by the license plate detection and recognition system 122 may be also performed or distributed to another server such as a third-party server 112. For example, the detection of license plates may be performed at the license plate detection and recognition system 122 and the recognition of license plates may be performed at the third-party server 112.

The web client 110 communicates with the license plate detection and recognition system 122 via the web interface supported by the web server 120. Similarly, the programmatic client 108 communicates with the license plate detection and recognition system 122 via the programmatic interface provided by the Application Program Interface (API) server 118. The third-party application 114 may, for example, be a another application to support the license plate detection and recognition system 122 or mine the data from the license plate detection and recognition system 122. For example, the third-party application 114 may access location information, registration information, and other information related to the cars with the identified license plates. The application server 116 is shown to be communicatively coupled to database servers 124 that facilitates access to an information storage repository or databases 126. In an example embodiment, the databases 126 includes storage devices that store information to be published and/or processed by the license plate detection and recognition system 122.

Figure 2:
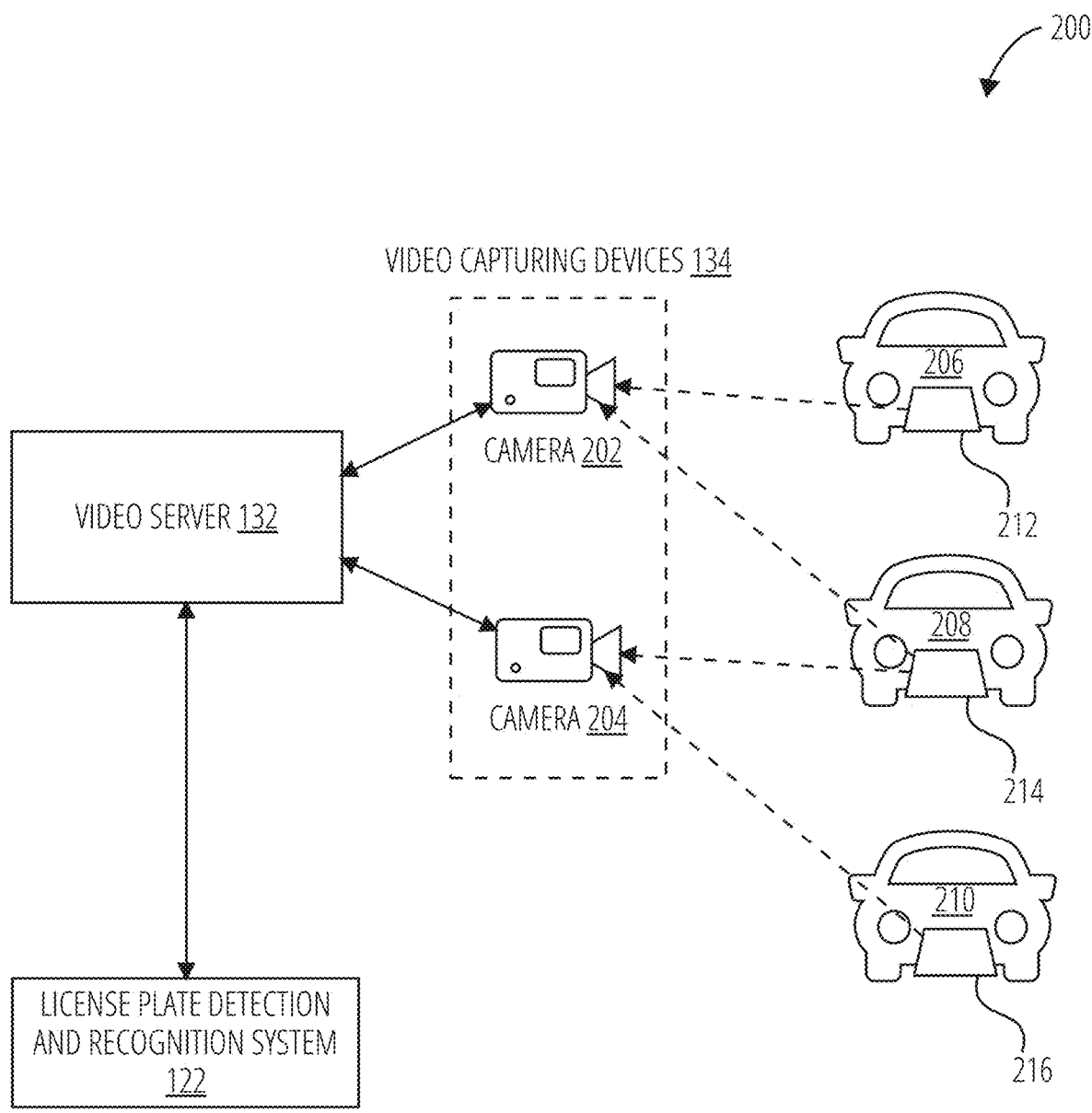
FIG. 2 illustrates an example operation of a system for capturing and recognizing license plates in accordance with one embodiment.

FIG. 2 illustrates an example operation of a system for capturing and recognizing license plates in accordance with one embodiment. The video capturing devices 134 includes camera 202 and camera 204 that generate image/video data of the cars 206, 208, 210, and their corresponding license plates 212, 214, and 216. The video capturing devices 134 may be installed across multiple locations. Examples of locations include, but are not limited to, roads, parking spaces, garages, toll booths, outside residential areas, outside office spaces, outside public places (such as malls, recreational areas, museums, libraries, hospitals, police stations, fire stations, schools, colleges), and the like. Examples of the video capturing devices 134 include, but are not limited to, Closed-Circuit Television (CCTVs) cameras, High Definition (HD) cameras, non-HD cameras, handheld cameras, traffic cameras, police car cameras, cameras on unmanned aerial vehicles (UAVs) or any other video/image grabbing modules.

The video server 132 receives a dynamic imagery or a video footage from the video capturing devices 134, and may transmit the associated data to the license plate detection and recognition system 122. A video/image archive (not shown) is a data storage that is configured to store pre-recorded or archived videos/images. The video/image archive may be composed of a plurality of local databases or remote databases. Also, the databases may be centralized and/or distributed. In an alternate scenario, the video/image archive may store data using a cloud based scheme. Similar to the video server 132, the video/image archive may transmit data to the license plate detection and recognition system 122.

In one example, the video server 132 communicates the image/video data to the license plate detection and recognition system 122 for further processing. In another example embodiment, the detection and recognition of the license plates may be performed either at the license plate detection and recognition system 122 or at the video server 132 or a combination of both.

In one example, the license plate detection and recognition system 122 may be part of at least one of a surveillance system, a security system, a traffic monitoring system, a home security system, and a toll fee system. The license plate detection and recognition system 122 may be configured to receive data from at least one of: video server 132, the video/image archive, and/or client device 106. The data may be in form of one or more video streams and/or one or more images. In case of the one or more video streams, the license plate detection and recognition system 122 may convert each stream into a plurality of static images or frames. The license plate detection and recognition system 122 may process the one or more received images (or static image frames of videos) and execute a license plate detection technique. In the detection technique, the one or more images may be analyzed and one or more regions containing vehicle license plates may be detected. For each license plate, the license plate detection and recognition system 122 may recognize the characters that make up the vehicle license/registration number.

In an example embodiment, the video capturing devices 134, the license plate detection and recognition system 122 may be integrated in a single device, where the single device is either a portable smartphone having a built-in camera and a display, or an integrated LPDR device.

In another example embodiment, the license plate detection and recognition system 122 may be a custom LPDR recognition server software to provide real-time license plate detection and recognition for all cameras on a local network.

In yet another example embodiment, the license plate detection and recognition system 122 may be a processing device that does not include a GPU, and includes limited CPU capabilities to run license plate detection and recognition processes. The license plate detection and recognition system 122 is described in more detail below with respect to FIG. 3.

Figure 3:
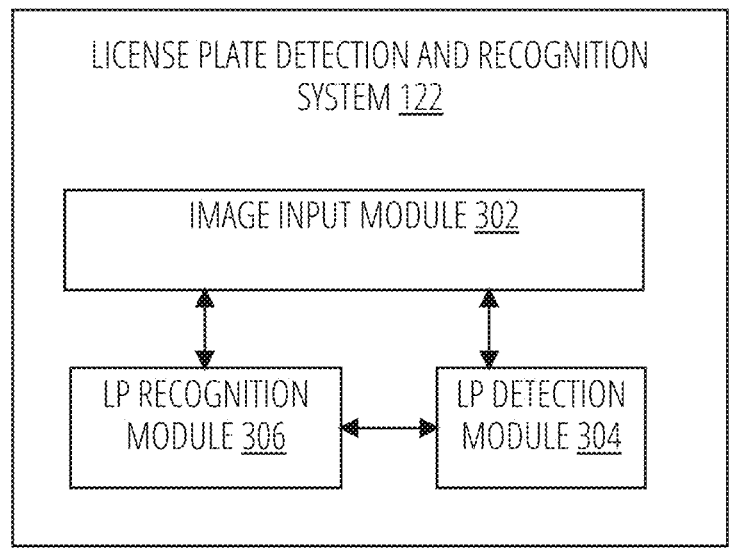
FIG. 3 is a block diagram illustrating an example of a license plate detection and recognition (LPDR) system (LPDR) in accordance with one example embodiment.

FIG. 3 is a block diagram illustrating an example of a license plate detection and recognition (LPDR) system (LPDR) in accordance with one example embodiment. The license plate detection and recognition system 122 includes an image input module 302 for receiving an input image/video, an LP detection module 304 for detecting a license plate in the input image/video, and an LP recognition module 306 for recognizing a license plate identifier in the detected license plate, and displaying the LP data on an associated display device.

The image input module 302 is configured to receive data from at least one of: the video server 132, the video/image archive, the client device 106, and the third-party server 112. The data may be in form of one or more video streams and/or one or more images. In case of the one or more video streams, the image input module 302 may convert each stream into a plurality of static images or frames.

In one example embodiment, the license plate detection and recognition system 122 enables a user to specify the following parameters before processing the input image:
   a country identifier
   processing mode: either a single image or video stream
     mode
   performance and accuracy profile: depending on required
     quality of processing, it is possible to switch to more accurate but more CPU consuming profile or go with a profile which is well balanced between high accuracy and performance multi-core support mode: depending on need, processing can be done using a single, several or all available cores of the license plate detection and recognition system 122.

Figure 10:
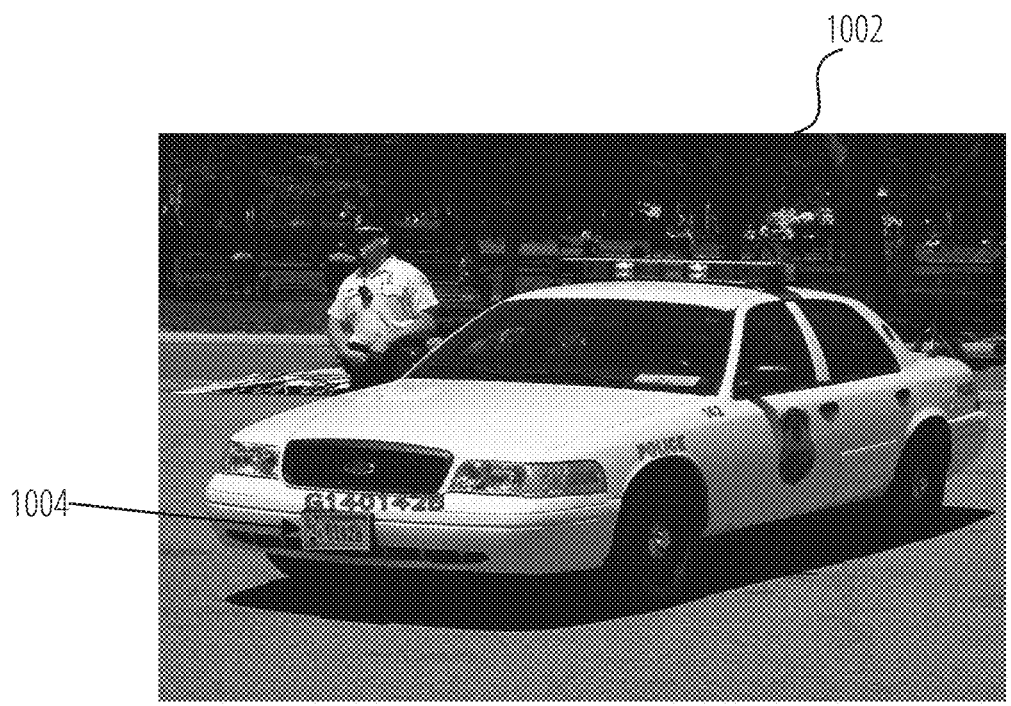
FIG. 10 illustrates an exemplary input image that includes a single license plate in accordance with one example embodiment.

The LP detection module 304 is configured to analyze the input image from the image input module 302 and to identify one or more LP regions, such that each LP region includes an image of a license plate. With reference to FIG. 10, an image 1002 is received by the image input module 302, and is transferred to the LP detection module 304, such that the LP detection module 304 detects a license plate region 1004 containing a license plate.

In one example embodiment, the LP detection module 304 may be built on top of a Convolutional Neural Network (CNN) based technology, where the CNN is a machine learning model related to computer vision and image processing that deals with detecting instances of semantic objects of a certain class in digital images and videos. In one example, the LP detection module 304 may be implemented using a Single Shot Multi-box detector (SSD) or a DetectNet architecture that has been chosen as a default baseline, and optimized for accuracy and performance aspects, by adjusting a number of layers, an input image size, and classification layers.

In another example embodiment, the LP detection module 304 may receive a color image (3 channel) as an input image, and then passes the input image through multiple computation layers to detect one or more LP regions that are most probable to be license plates. Each LP region may include a license plate, and the license plates detected in the image may be of different sizes.

In another example embodiment, the LP detection module 304 detects the coordinates of bounding boxes of multiple license plates in an image. The LP detection module 304 detects and marks the bounding boxes of the license plates in such a way that the bounding boxes when displayed on the display device mostly do not overlap with each other. The LP detection module 304 is configured to detect and report all clearly visible LPs of expected sizes. Thus, based on the detection, the LP detection module 304 may return an array of LP regions, referred to as LP_CANDIDATES_ARRAY {BBox, Type}, where for each LP region, the LP detection module 304 may return coordinates of corresponding bounding boxes, and a type of the LP region. The type specifies, if the detected LP region is a one row license plate, or a multiple row license plate.

The LP detection module 304 is further configured to filter the array of LP regions to remove the duplicate LP regions, and also less probable/false LP regions, to generate a filtered array of LP regions, referred to as LP_CANDIDATES_FILTERED_ARRAY {BBox, Type}. The process of filtering significantly reduces the total number of LP regions, thereby reducing the processing time, and increasing the overall efficiency of the license plate detection and recognition system 122.

The LP recognition module 306 may be built on the top of a CNN, and is configured to perform segmentation and recognition operations. In an example embodiment, the LP recognition module 306 is configured to receive the filtered array of LP candidate regions from the LP detection module 304, and process each LP region based on its type.

In one example embodiment, the LP recognition module 306 may implement the following three phase processing to process the filtered array of LP candidate regions:

Firstly, for each LP region, the LP recognition module 306 may use a first type of CNN such as STN based CNN model to determine the parameters required for a first affine transformation from a current state/representation to a horizontally oriented license plate. In an example, for each LP candidate region, the LP recognition module 306 may compute an angle needed for rotation of corresponding license region to put the corresponding license plate in a horizontally aligned state, if the license plate is not in the horizontally aligned state.

Secondly, the LP recognition module 306 may rotate one or more LP regions by corresponding computed angles, to keep the license plates of corresponding LP regions in a horizontally aligned state. This step significantly reduces complexity of corresponding CNN and improves overall recognition accuracy as well.

Finally, depending on required level of accuracy and type, the LP recognition module 306 may use a second type of CNN model such as ResNet or STN based model (that has densenet-style layers) for simultaneous segmentation and recognition of text data for each LP candidate region. The LP recognition module 306 may perform end-to-end segmentation and recognition for a given horizontally oriented LP candidate, and recognize corresponding LP identifier as a sequence of alphanumeric characters. Thereafter, the LP recognition module 306 returns the LP identifier accompanied with a level of recognition confidence.

In one example embodiment, the license plate detection and recognition system 122 may include a LP tracking module (not shown) to use a recognized LP identifier of an input image to update the recognized LP identifier of a previous input image, when the input image is a part of an input video stream.

Thus, with the given approach and training, the LP recognition module 306 may perform very accurate recognition for single, multi-row and stacked license plates. The success rate of recognition may be more than 95%, if an input image of a license plate was taken in more or less reasonable conditions, or at least a human may detect and read such a license plate without difficulty.

In another example embodiment, the license plate detection and recognition system 122 may transmit the LP recognition results to other components for further processing, storage, or such as the user interface for display. In an example, the coordinates of bounding boxes and license plate identifiers of recognized LPs may be sent as a message along with the video frames, to display labels and/or bounding boxes on live video streams on an associated display device. In one embodiment, the license plate detection and recognition system 122 may generate a video output for display in which bounding boxes are drawn around detected license plates, along with the recognized license identifier.

Although, the license plate detection and recognition system 122 is shown to have three modules, it would be apparent to one of ordinary skill in the art that the license plate detection and recognition system 122 may add more sub modules and neural networks to support additional countries, states, regions, and applications, where combination of numeral and character based signs on the license plates can be successfully detected and recognized.

In one example embodiment, the license plate detection and recognition system 122 may include a LP location detection module (not shown) that does automatic determination of a registered country/state of corresponding vehicle, based on content of a detected license plate.

Figure 4:
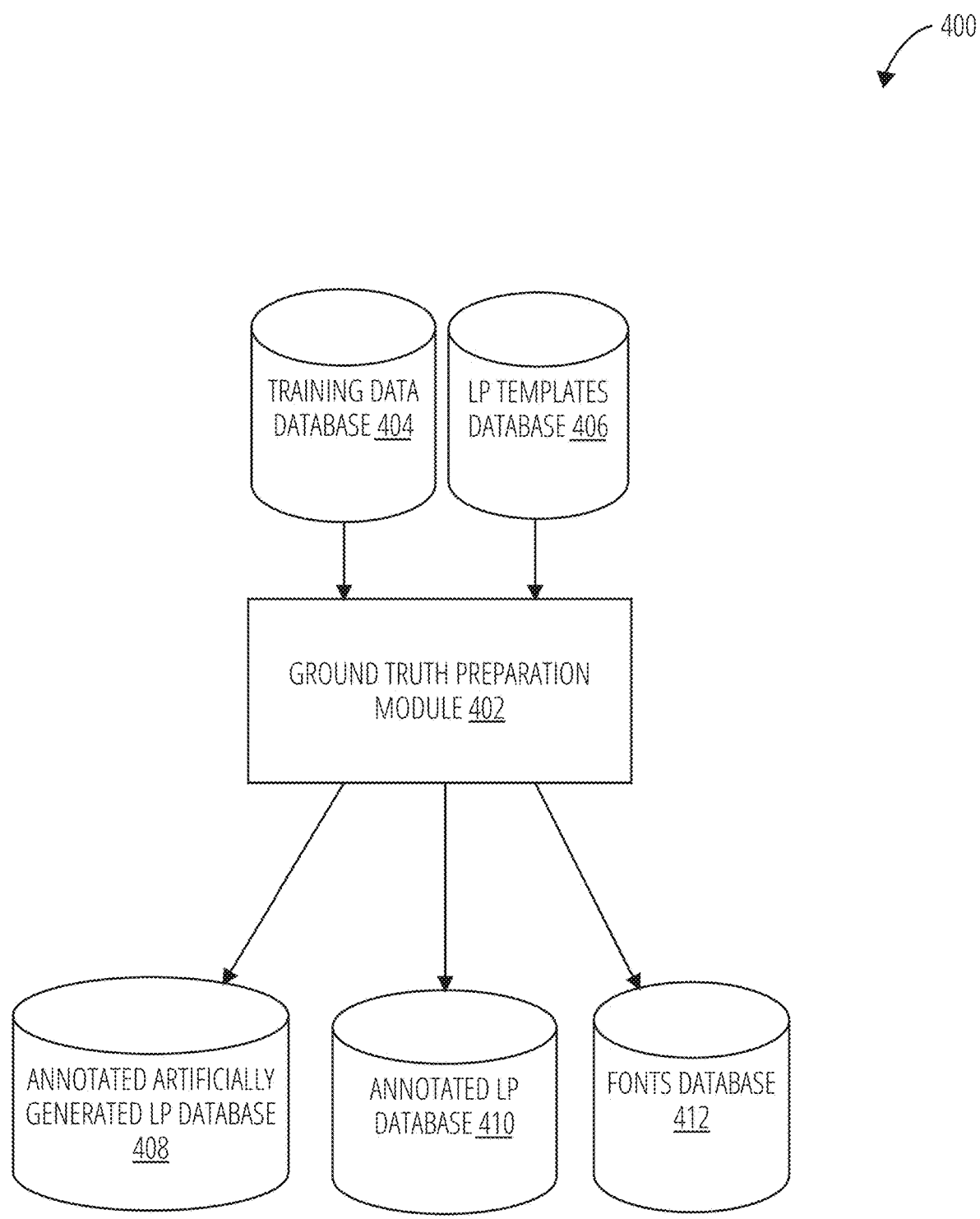
FIG. 4 illustrates a ground truth (GT) preparation module for training the LPDR system of FIG. 3, in accordance with one example embodiment.

FIG. 4 illustrates a ground truth (GT) preparation module for training the LPDR system of FIG. 3, in accordance with one example embodiment.

The ground truth preparation module 402 prepares specific data needed for training and validation of different LPDR modules of the license plate detection and recognition system 122. The preparation of ground truth data may be performed prior operating machine learning and deep learning techniques. The feeding of reasonable data into a training process allows for control of what the ground truth preparation module 402 may interpret as reasonable data to be extracted from an input video frame or image. In one example embodiment, the ground truth preparation module 402 receives real data from a training data database 404, and LP templates forms from an LP templates database 406. Thereafter, the ground truth preparation module 402 prepares ground truth data for the license plate detection and recognition system 122, using LP ground truth preparation and verification tools, through LP template preparation procedure and fonts extraction, to generate an annotated artificially generated LP database 408, an annotated LP database 410, and a fonts database 412.

In one embodiment, the following information may be fed into the ground truth preparation module 402 to prepare ground truth for the LP detection module 304:

Information regarding types of license plates, for example, one row license plate, two or multi-row license plate, as the license plates are distinguishable by the number of rows;

Information that the one row license plate detector is being used to detect a license plate with stacked letters;

License plates which have sufficient size and observed for at least 50% of their width/height. It does not matter if content of a license plate is clearly visible or blurred, but if it can be detected by a person easily;

Alphanumeric template information accompanied with specific fonts used for generation of license plates onto training images;

LP bounding box points and number of LP identifier text rows on it for generation of license plates onto images which are re-used for further training;

In another example embodiment, the following information may be fed into the ground truth preparation module 402 to prepare ground truth for the LP recognition module 306:

Fully-visible and clearly recognizable license plates of training images

Figure 5:
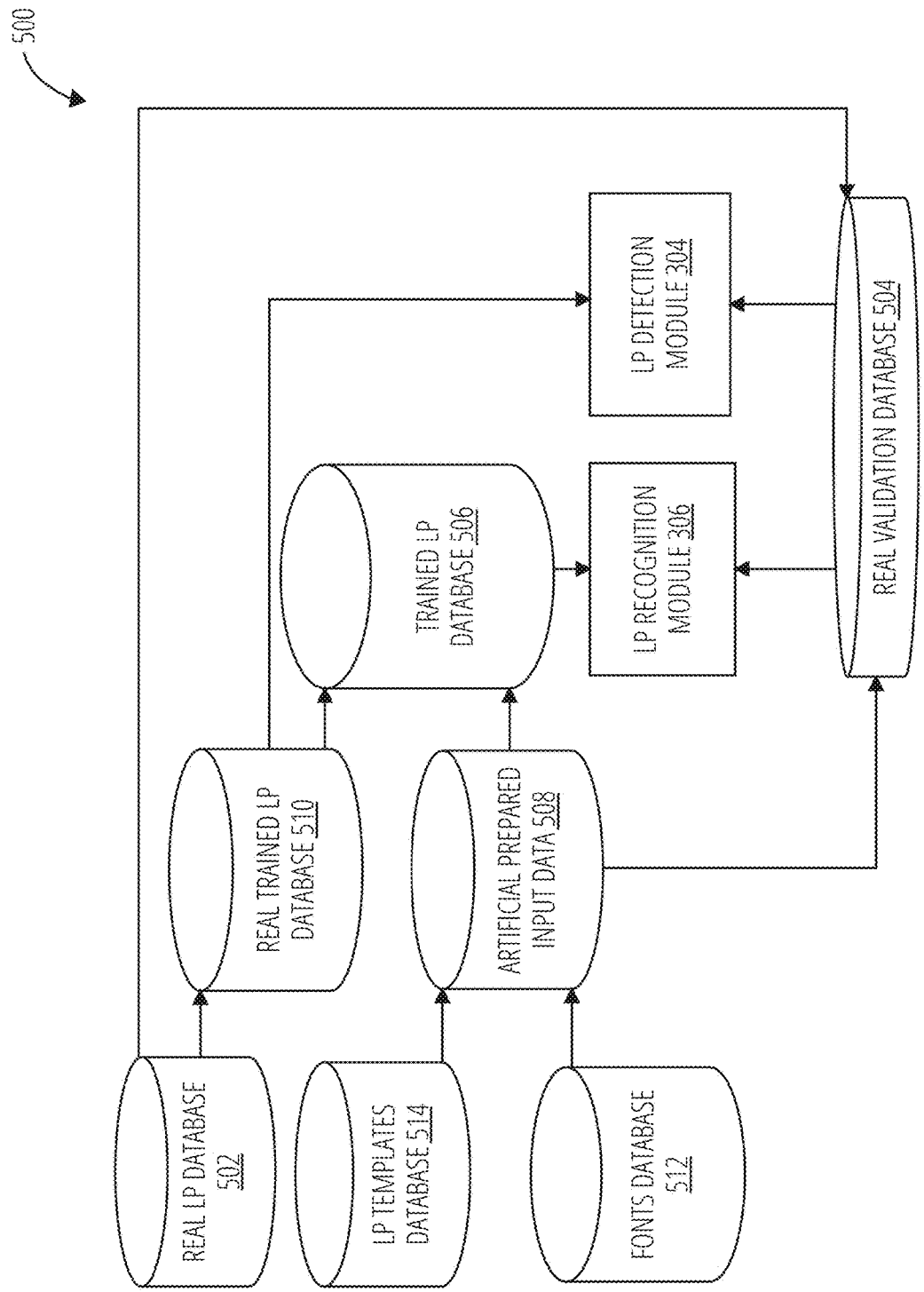
FIG. 5 illustrates preparation of LP detection module and LP recognition module for forming the LPDR system of FIG. 3, in accordance with one example embodiment.

One or more templates for every unique license plate format, where the format usually includes an image of a template of a license plate without LP identifier A mask image with information about how LP identifier data is supposed to be put on a template image Information about regions of output for alphanumeric data accompanied with an output format Fonts and sizes used for drawing characters over a LP template Coordinates of bounding boxes for all license plates of training images Region/state information of license plates of training images Country information of license plates of training images FIG. 5 illustrates preparation of LP detection module 304 and LP recognition module 306 for forming the LPDR system of FIG. 3, in accordance with one example embodiment.

In operation, the real LP database 502 is augmented and mixed with some proportion with artificial prepared input data 508 (also referred to as artificial LP samples). The artificial prepared input data 508 is generated using LP templates database 514, fonts database 512 and information about expected sequences of alpha-numeric based formats of LP IDs. When the real LP database 502 and the artificial prepared input data 508 are merged into a trained LP database 506, then it is used for training of the LP recognition module 306. At the same time, according to the current process, the real LP database 502 are used for training of the LP detection module 304. For validation purposes, some artificial prepared input data from artificial prepared input data 508 and some real LP data from real trained LP database 510 may be separated from the training dataset. However, data from the real trained LP database 510 and the artificial prepared input data 508 can be used for blind validation of the LP detection module 304 and LP recognition module 306 respectively.

Figure 6:
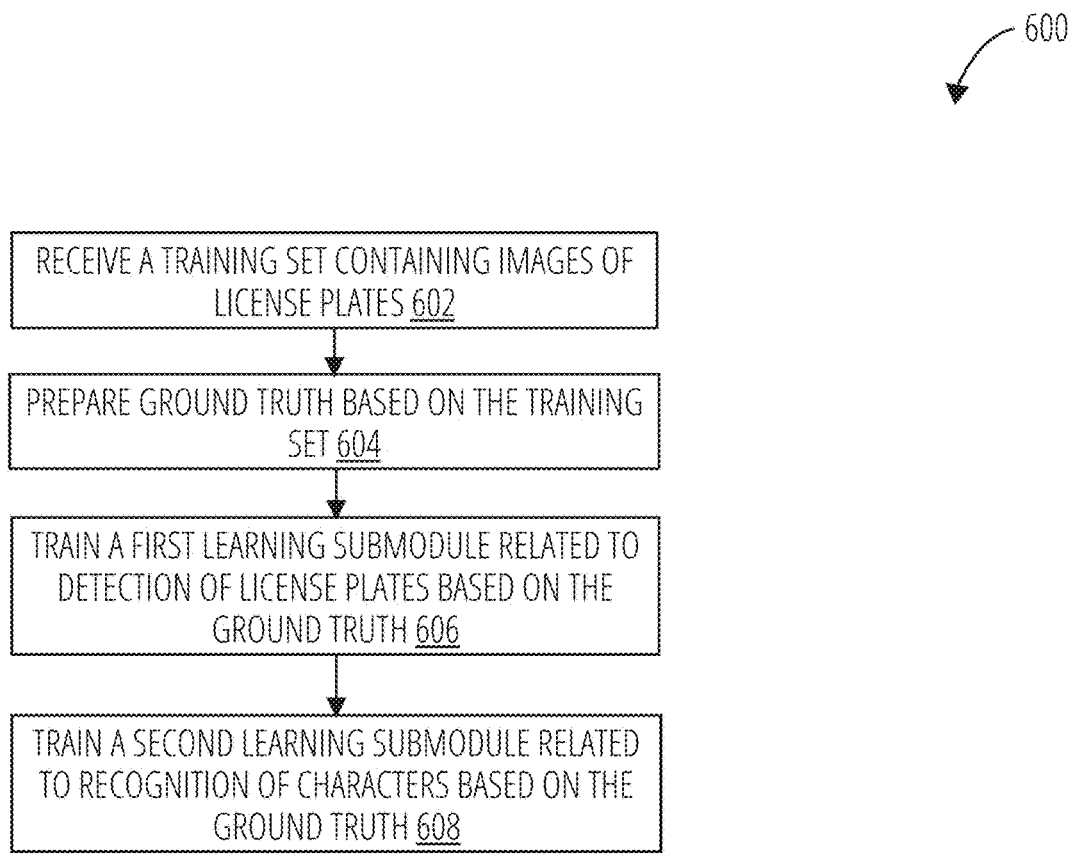
FIG. 6 is a flow diagram illustrating a method for training learning submodules of the LPDR system of FIG. 3, in accordance with an example embodiment.

FIG. 6 is a flow diagram illustrating a method for training learning submodules of the LPDR system of FIG. 3, in accordance with an example embodiment. Operations in the method 600 may be performed by the license plate detection and recognition system 122, using components (e.g., modules, engines) described above with respect to FIG. 3. Accordingly, the method 600 is described by way of example with reference to the license plate detection and recognition system 122. However, it shall be appreciated that at least some of the operations of the method 600 may be deployed on various other hardware configurations or be performed by similar components residing elsewhere.

At block 602, the license plate detection and recognition system 122 receives a training set containing images of license plates. At block 604, the license plate detection and recognition system 122 prepares ground truth based on the training set. At block 606, the license plate detection and recognition system 122 trains a first learning submodule related to the detection of license plates based on the ground truth. At block 608, the license plate detection and recognition system 122 trains a second learning submodule related to recognition of characters based on the ground truth.

Figure 7:
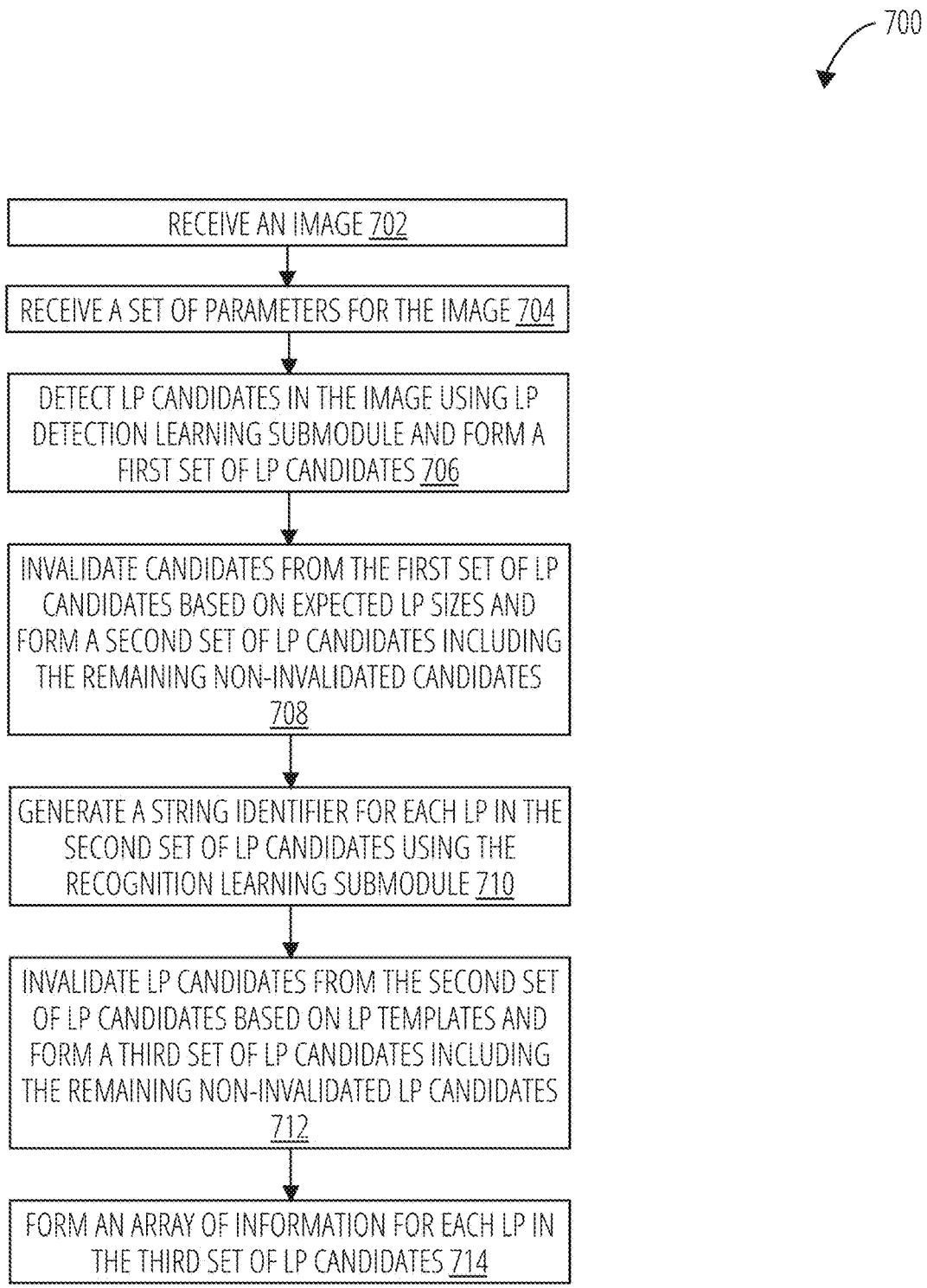
FIG. 7 is a flow diagram illustrating a method for using the LPDR system of FIG. 3, in accordance with an example embodiment.

FIG. 7 is a flow diagram illustrating a method for using the LPDR system of FIG. 3, in accordance with an example embodiment. Operations in the method 700 may be performed by the license plate detection and recognition system 122, using components (e.g., modules, engines) described above with respect to FIG. 3. Accordingly, the method 700 is described by way of example with reference to the license plate detection and recognition system 122. However, it shall be appreciated that at least some of the operations of the method 700 may be deployed on various other hardware configurations or be performed by similar components residing elsewhere.

At block 702, the license plate detection and recognition system 122 receives an image from the image input module 302. At block 704, the license plate detection and recognition system 122 receives a set of parameters for the image. At block 706, the license plate detection and recognition system 122 detects license plate candidates in the image using LP detection module 304 and form a first set of LP candidates. At block 708, the license plate detection and recognition system 122 invalidates candidates from the first set of LP candidates that includes the remaining non-invalidated candidates. At block 710, the license plate detection and recognition system 122 generates a string identifier for each LP in the second set of LP candidates using the LP recognition module 306. At block 712, the license plate detection and recognition system 122 invalidates LP candidates from the second set of LP candidates based on LP templates and forms a third set of LP candidates including the remaining non-invalidated LP candidates. At block 714, the license plate detection and recognition system 122 forms an array of information for each LP in the third set of LP candidates.

Figure 8:
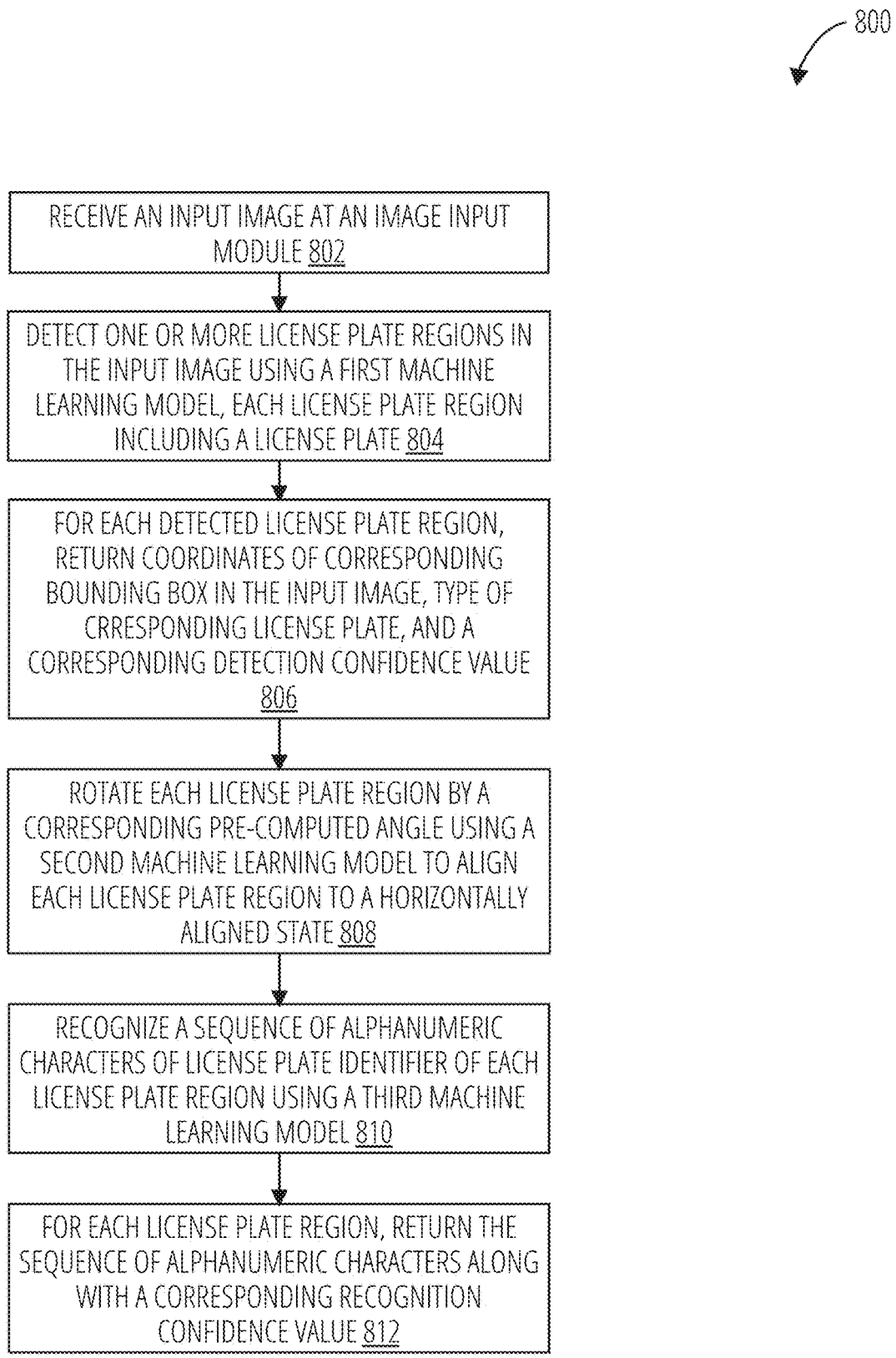
FIG. 8 is a flow diagram illustrating a method for using the LPDR system of FIG. 3, in accordance with another example embodiment.
Figure 9:
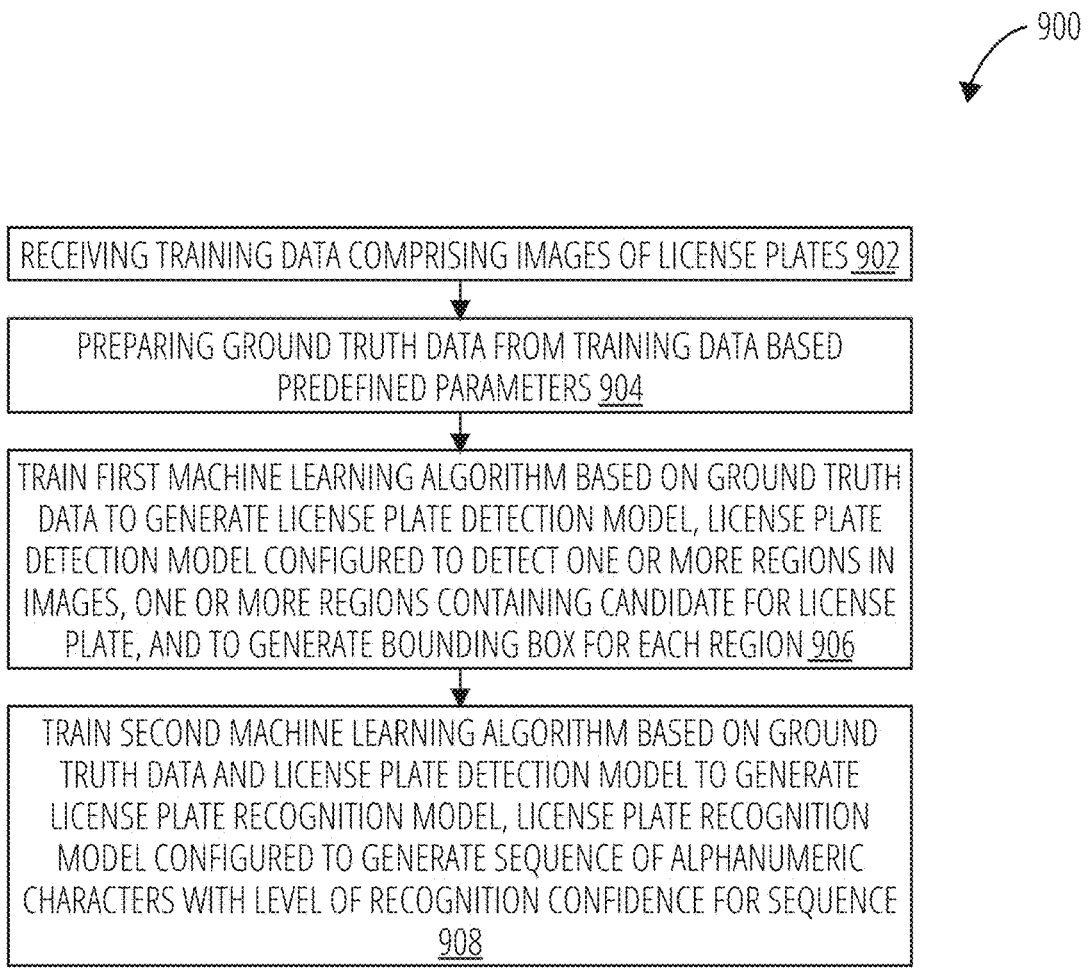
FIG. 9 illustrates a routine in accordance with one embodiment.

FIG. 8 is a flow diagram illustrating a method for using the LPDR system of FIG. 3, in accordance with another example embodiment. Operations in the method 800 may be performed by the license plate detection and recognition system 122, using components (e.g., modules, engines) described above with respect to FIG. 3. Accordingly, the method 800 is described by way of example with reference to the license plate detection and recognition system 122. However, it shall be appreciated that at least some of the operations of the method 800 may be deployed on various other hardware configurations or be performed by similar components residing elsewhere.

At block 802, an input image is received at the image input module 302. For example, the image input module 302 receives a single snapshot or a video stream of frames with vehicles moving through a scene. If the image input module 302 receives a video stream (instead of an image), the video stream may be divided into a sequence of image frames by the image input module. In an example, the input image is a color image and is at least of D1 resolution.

At block 804, one or more LP regions are detected in the input image by the LP detection module 304 using a machine learning model. In an example, the input image is passed through multiple computation layers of a Convolutional Neural Network (CNN) to detect one or more LP regions that are most probable to be license plates. Each LP region may be of different sizes. In one example embodiment, one or more detected LP regions may be invalidated by the LP detection module 304 taking into account the expected LP sizes, mutual arrangement and corresponding confidence values to obtain a set of validated LP regions.

At block 806, for each detected LP region, coordinates of corresponding bounding box in the input image, type of corresponding LP and a corresponding detection confidence value are returned by the LP detection module 304 in form of an array. The type of the license plate is selected from at least one of: a single row license plate comprising one or more characters in a single row or stacked form, and a multiple row license plate. In an embodiment of the present disclosure, the detected LP regions may be filtered to remove the duplicate LP regions, and also less probable/false LP regions of the input image.

At block 808, each LP region is rotated by a corresponding pre-computed angle by an LP recognition module 306, using another machine learning model, to align each LP region to a horizontally aligned state. In one embodiment, the LP recognition module 306 includes a CNN based LP recognizer to determine a rotation angle of each detected LP region to align the same to a horizontally aligned state, and rotate the LP region by the determined rotation angle.

At block 810, a sequence of alphanumeric characters of LP identifier of each LP region is recognized by the LP recognition module 306 using yet another machine learning model. In one embodiment, the LP recognition module 306 is provided with native characters support for recognizing the LP identifier of each LP region. For example, the LP recognition module 306 may use a pre-defined set of native characters of the country with whom the LP is registered, in addition to characters of English alphabets to recognize the corresponding LP identifier. For different countries, the LP recognition module 306 may support customization of LP ID content so it may include native letters too. The LPID results may be provided in a UTF8 form. In another example embodiment, the LP recognition module 306 performs invalidation of one or more recognized LP identifiers based on information of minimal/maximal number of characters, expected LP template, and a corresponding recognition confidence value.

At block 812, for each LP region, the sequence of recognized alphanumeric characters is returned by the LP recognition module 306 along with a corresponding recognition confidence value. In one embodiment, an array of license plates is returned that have successfully passed phases of detection and recognition. The array includes a string identifier, a recognition confidence value, and bounding box coordinates of each recognized license plate therein. In an embodiment of the present disclosure, when the input image is part of an input video stream, the license plate detection and recognition system 122 includes a license plate tracking module to perform a look-up for every detected and recognized LP to check if this LP was reported before. If the LP was reported before, then the previously reported LP is updated with the most recent information (if it is more accurate). If the LP was not reported before, then the current LP is marked with a new LP flag. Thus, the recognized LP identifier of a current input image is continuously tracked to update the recognized LP identifier of a previous input image of the input video stream. In one example embodiment, each recognized LP is displayed on the input image in a corresponding bounding box, along with corresponding LP identifier and a recognition confidence value. In another example embodiment, the coordinates (location) and label (identification) of the license plate may be displayed on live video streams or input images, or may be stored with corresponding frame, or used for transmitting alerts, or other purposes.

In block 902, routine 900 receiving training data comprising images of license plates. In block 904, routine 900 preparing ground truth data from the training data based predefined parameters. In block 906, routine 900 trains a first machine learning algorithm based on the ground truth data to generate a license plate detection model, the license plate detection model configured to detect one or more regions in the images, the one or more regions containing a candidate for a license plate, and to generate a bounding box for each region. In block 908, routine 900 trains a second machine learning algorithm based on the ground truth data and the license plate detection model to generate a license plate recognition model, the license plate recognition model configured to generate a sequence of alphanumeric characters with a level of recognition confidence for the sequence.

FIG. 10 illustrates an exemplary input image that includes a single license plate in accordance with one example embodiment. The image input module 302 may receive the image 1002. The LP detection module 304 detects the license plate region 1004. The LP recognition module 306 determines the alphanumeric portion in the license plate license plate region 1004.

Figure 11:
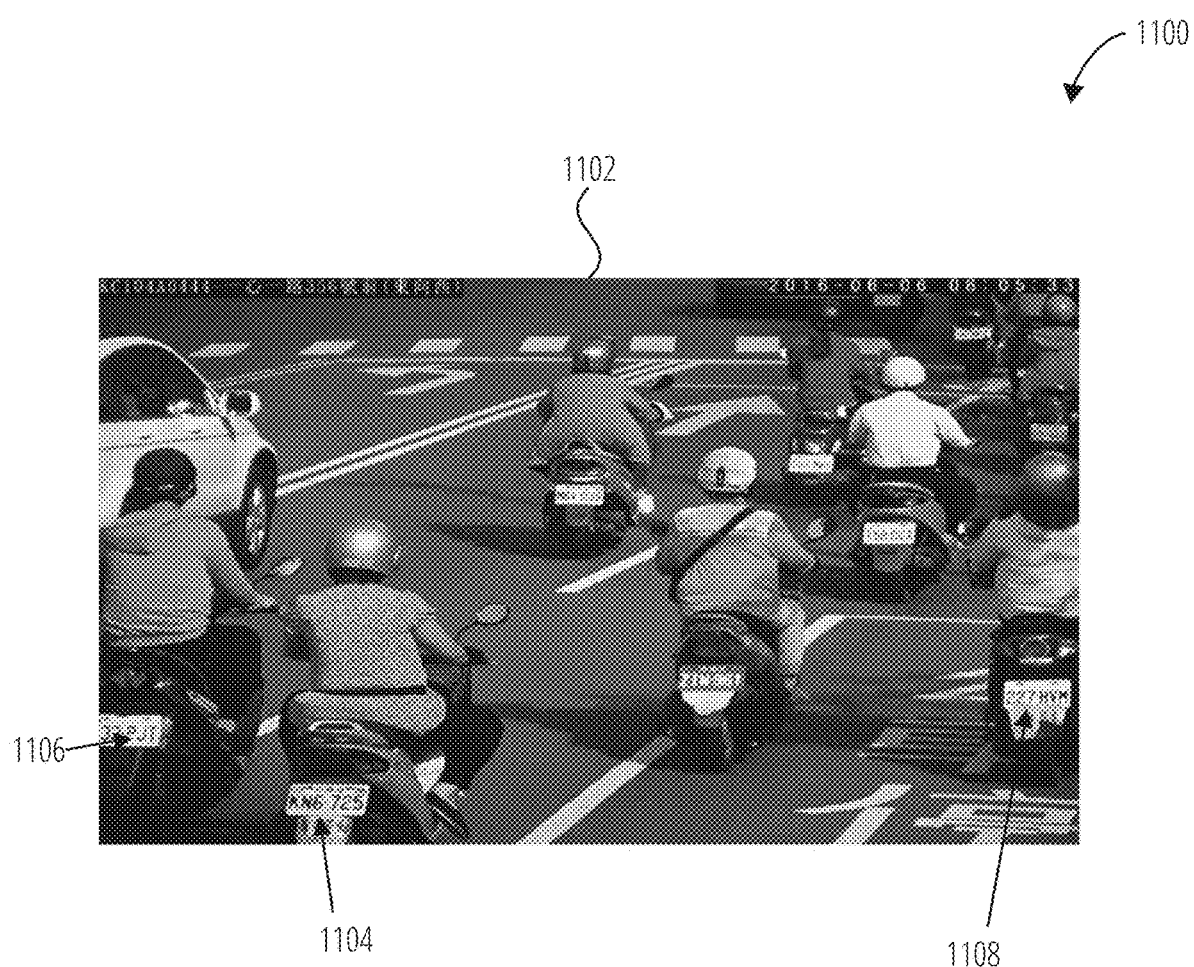
FIG. 11 illustrates an exemplary input image that includes a single license plate in accordance with one example embodiment.

FIG. 11 illustrates an exemplary input image 1102 that includes several license plates in accordance with one example embodiment. The LP detection module 304 detects the coordinates of bounding boxes of the multiple license plates (license plate 1104, license plate 1106, license plate 1108). In one example embodiment, the LP detection module 304 detects and marks the bounding boxes of the license plates 1104, 1106, 1108 in such a way that the bounding boxes when displayed on the display device mostly do not overlap with each other.

Although, three images of license plates 1104, 1106, 1108 are illustrated herein for detection by the LP detection module 304, it would be apparent to one of ordinary skill in the art, that the LP detection module 304 is configured to detect and report all clearly visible LPs of expected sizes.

Figure 12:
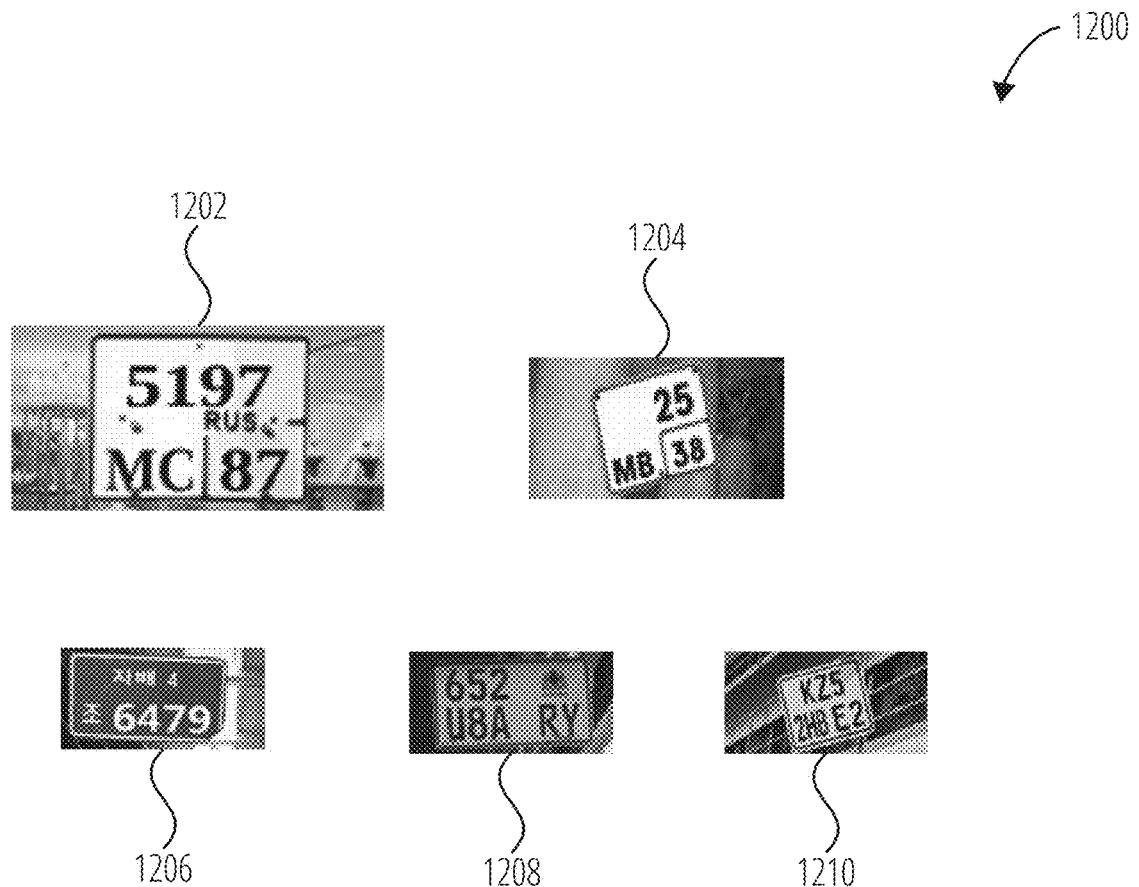
FIG. 12 illustrates exemplary LP regions received by the LP recognition module of FIG. 3 for training.

FIG. 12 illustrates exemplary LP regions received by the LP recognition module 306 of FIG. 3 for training. In one example, the LP recognition module 306 may rotate the regions 1204, 1206, 1208, and 1210 respectively by corresponding predefined angles so as to horizontally align the corresponding license plates.

By horizontally aligning the license plates of regions 1204, 1206, 1208, and 1210, the complexity of further training may be reduced, and the overall license plate training process may be made more robust, effective and accurate. All characters within a license plate now may be generally placed in approximately the same positions. The training of license plates at random rotation and tilt angles may require adding significant amount of memory/weights for being able to recognize License plate identifiers (LPID) at random angles.

Figure 13:
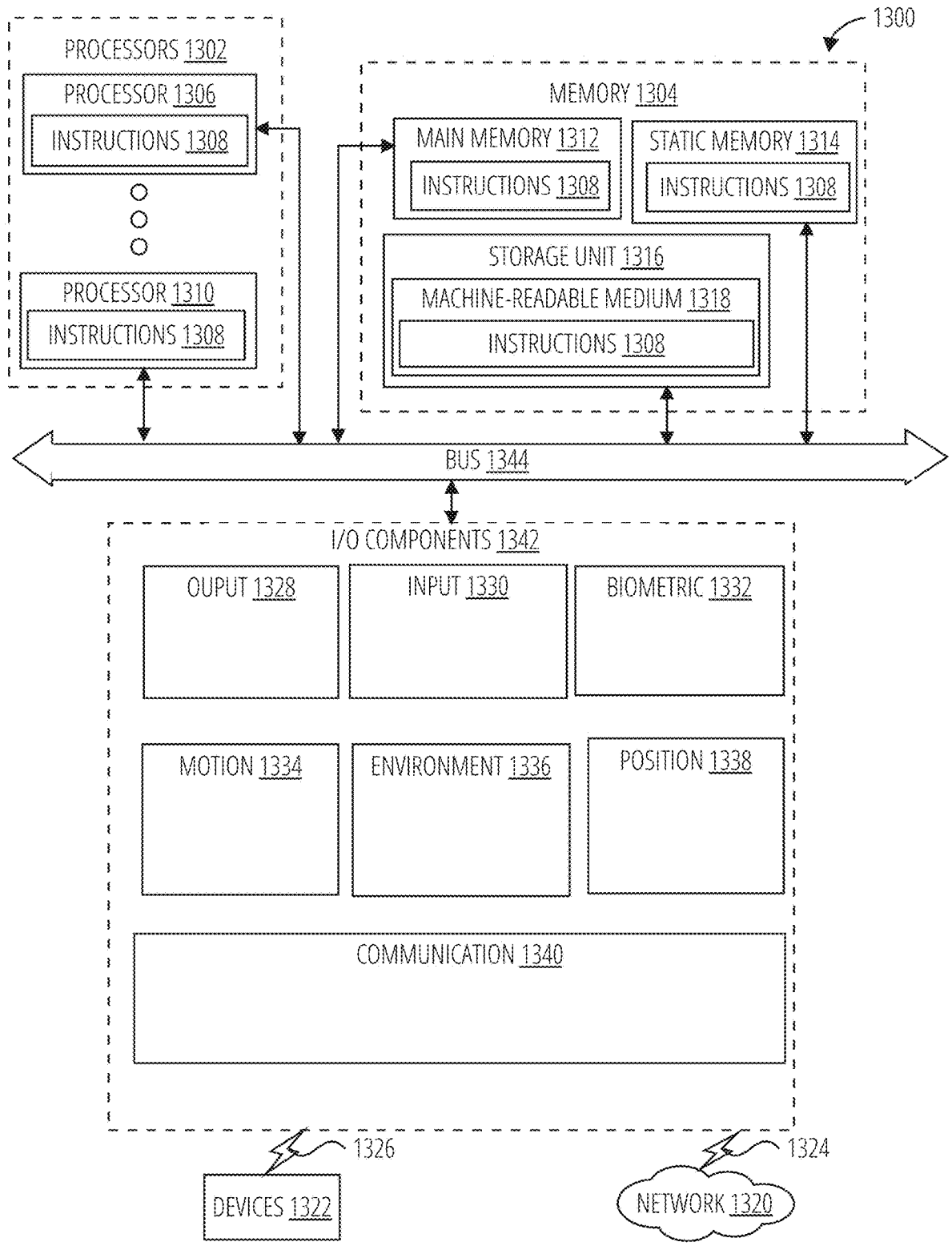
FIG. 13 is a diagrammatic representation of a machine in the form of a computer system within which a set of instructions may be executed for causing the machine to perform any one or more of the methodologies discussed herein, according to an example embodiment.

FIG. 13 is a diagrammatic representation of the machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In an example embodiment, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various example embodiments, the I/O components 1342 may include output components 1328 and input components 1330. The output components 1328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed embodiments.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving training data comprising images of license plates;
   preparing ground truth data from the training data based on predefined parameters;
   training a first machine learning algorithm based on the ground truth data to generate a license plate detection model, the license plate detection model configured to detect one or more regions in the images, the one or more regions containing a candidate for a license plate, and to generate a bounding box for each license plate;
   training a second machine learning algorithm based on the ground truth data and the license plate detection model to generate a license plate recognition model, the license plate recognition model configured to generate a sequence of alphanumeric characters in the bounding box with a level of recognition confidence for the sequence;

receiving an input image;

determining a bounding box corresponding to an image of each candidate license plate in the input image by applying the license plate detection model to the input image, the bounding box indicating a license plate type and a corresponding confidence level;

forming a first set of candidates based on the determined bounding boxes;

first invalidating one or more candidates in the first set of candidates in response to detecting that a first feature of the one or more candidates in the first set of candidates exceeds a first feature threshold;

forming a second set of candidates of remaining candidates after the first invalidating;

generating a string identifier with a corresponding confidence level for each license plate in each bounding box by applying the license plate recognition model to the second set of candidates;

second invalidating one or more candidates in the second set of candidates in response to detecting that a second feature of the one or more candidates in the second set of candidates exceeds a second feature threshold;

forming a third set of candidates of remaining candidates after the second invalidating; and generating, based on the third set of candidates, an array of license plate information comprising an image of a license plate from the input image, a corresponding string identifier, corresponding bounding box coordinates, and a corresponding confidence level.

2. The computer-implemented method of claim 1, further comprising:

generating a string identifier with a corresponding confidence level for the license plate in the bounding box by applying the license plate recognition model to the image of the license plate within the bounding box.

3. The computer-implemented method of claim 2, wherein generating the string identifier comprises:

determining a rotation angle of the bounding box using a third machine learning algorithm;

aligning the image of the license plate in the bounding box to a horizontally aligned state by performing a rotation of the image of the license plate in the bounding box with the rotation angle; and performing a segmentation of the aligned image of the license plate to determine the string identifier corresponding to the license plate.

4. The computer-implemented method of claim 1, wherein the predefined parameters comprise: a number of rows for each license plate in the images, a minimum size for each license plate in the images, a minimum ratio of width to height for each license plate in the images, a minimum visibility for each license plate in the images, a template for each license, fonts, and text identifier from each license plate in the images.

5. The computer-implemented method of claim 1, wherein the first machine learning algorithm includes a first convolution neural network (CNN) based algorithm, wherein the second machine learning algorithm includes a second convolution neural network (CNN) based algorithm.

6. The computer-implemented method of claim 1, further comprising:

detecting one or more license plate (LP) regions in the input image using the license plate detection model, wherein each LP region includes a license plate;

for each detected LP region, determining coordinates of a corresponding bounding box in the input image, a corresponding type of LP, and a corresponding detection confidence value;

determining a rotation angle for each LP region using a third machine learning model, the rotation angle configured to align each LP region to a horizontally aligned state;

rotating each LP region by a corresponding rotation angle; and determining a sequence of alphanumeric characters of LP identifier in each rotated LP region with a recognition confidence value corresponding to the sequence, using the license plate recognition model.

7. The computer-implemented method of claim 6, wherein the type of the license plate is selected from at least one of: a single row license plate comprising one or more characters in a single row or a stacked form, and a multiple row license plate.

8. The computer-implemented method of claim 6, wherein training the first machine learning algorithm based on the ground truth data, wherein the ground truth data comprises historical data regarding detection of a single row license plate of stacked letters from one or more images, detection of a multiple row license plate from one or more images, standard size and dimensions of each type of license plate, bounding box points of one or more license plates, and number of corresponding license plate identifier text rows for each type of bounding box.

9. The computer-implemented method of claim 6, wherein training the second machine learning algorithm based on the ground truth data, wherein the ground truth data comprises historical data regarding one or more images of a template of a license plate without identifier, a mask image with information about how license plate identifier data is put on a template image, and alphanumeric identifiers of one or more license plates visible in corresponding images.

10. The computer-implemented method of claim 6, further comprising:

validating each detected LP region before performing the license plate recognition, wherein the validation is performed based on an expected size of the license plate, mutual arrangement, and a detection confidence value; and validating the recognized LP identifier of the detected LP region, based on a minimal and maximal number of characters of the license plate identifier, an expected license plate template, and a level of recognition confidence value.

11. The computer-implemented method of claim 6, further comprising:

using the recognized license plate identifier of a current input image to update the recognized license plate identifier of a previous input image, in response to the current input image being a part of an input video stream.

12. A computing apparatus, the computing apparatus comprising:

a processor; and a memory storing instructions that, when executed by the processor, configure the apparatus to perform operations comprising:

receiving training data comprising images of license plates;

preparing ground truth data from the training data based on predefined parameters;

training a first machine learning algorithm based on the ground truth data to generate a license plate detection model, the license plate detection model configured to detect one or more regions in the images, the one or more regions containing a candidate for a license plate, and to generate a bounding box for each license plate;

training a second machine learning algorithm based on the ground truth data and the license plate detection model to generate a license plate recognition model, the license plate recognition model configured to generate a sequence of alphanumeric characters in the bounding box with a level of recognition confidence for the sequence;

receiving an input image;

determining a bounding box corresponding to an image of each candidate license plate in the input image by applying the license plate detection model to the input image, the bounding box indicating a license plate type and a corresponding confidence level;

forming a first set of candidates based on the determined bounding boxes;

first invalidating one or more candidates in the first set of candidates in response to detecting that a first feature of the one or more candidates in the first set of candidates exceeds a first feature threshold;

forming a second set of candidates of remaining candidates after the first invalidating;

generating a string identifier with a corresponding confidence level for each license plate in each bounding box by applying the license plate recognition model to the second set of candidates;

second invalidating one or more candidates in the second set of candidates in response to detecting that a second feature of the one or more candidates in the second set of candidates exceeds a second feature threshold;

forming a third set of candidates of remaining candidates after the second invalidating; and generating, based on the third set of candidates, an array of license plate information comprising an image of a license plate from the input image, a corresponding string identifier, corresponding bounding box coordinates, and a corresponding confidence level.

13. The computing apparatus of claim 12, wherein the instructions further configure the apparatus to:

generate a string identifier with a corresponding confidence level for the license plate in the bounding box by applying the license plate recognition model to the image of the license plate within the bounding box.

14. The computing apparatus of claim 13, wherein generating the string identifier comprises:

determine a rotation angle of the bounding box using a third machine learning algorithm;

align the image of the license plate in the bounding box to a horizontally aligned state by performing a rotation of the image of the license plate in the bounding box with the rotation angle; and perform a segmentation of the aligned image of the license plate to determine the string identifier corresponding to the license plate.

15. The computing apparatus of claim 12, wherein the predefined parameters comprise: a number of rows for each license plate in the images, a minimum size for each license plate in the images, a minimum ratio of width to height for each license plate in the images, a minimum visibility for each license plate in the images, a template for each license, fonts, and text identifier from each license plate in the images.

16. The computing apparatus of claim 12, wherein the first machine learn algorithm includes a first convolution neural network (CNN) based algorithm, wherein the second machine learning algorithm includes a second convolution neural network (CNN) based algorithm.

17. The computing apparatus of claim 12, wherein the instructions further configure the apparatus to:

detect one or more license plate (LP) regions in the input image using the license plate detection model, wherein each LP region includes a license plate;

for each detected LP region, determine coordinates of a corresponding bounding box in the input image, a corresponding type of LP, and a corresponding detection confidence value;

determine a rotation angle for each LP region using a third machine learning model, the rotation angle configured to align each LP region to a horizontally aligned state;

rotate each LP region by a corresponding rotation angle; and determine a sequence of alphanumeric characters of LP identifier in each rotated LP region with a recognition confidence value corresponding to the sequence, using the license plate recognition model.

18. A non-transitory computer-readable storage medium, the computer-readable storage medium including instructions that when executed by a computer, cause the computer to perform operations comprising:

receiving training data comprising images of license plates;

preparing ground truth data from the training data based on predefined parameters;

training a first machine learning algorithm based on the ground truth data to generate a license plate detection model, the license plate detection model configured to detect one or more regions in the images, the one or more regions containing a candidate for a license plate, and to generate a bounding box for each license plate;

training a second machine learning algorithm based on the ground truth data and the license plate detection model to generate a license plate recognition model, the license plate recognition model configured to generate a sequence of alphanumeric characters in the bounding box with a level of recognition confidence for the sequence;

receiving an input image;

determining a bounding box corresponding to an image of each candidate license plate in the input image by applying the license plate detection model to the input image, the bounding box indicating a license plate type and a corresponding confidence level;

forming a first set of candidates based on the determined bounding boxes;

first invalidating one or more candidates in the first set of candidates in response to detecting that a first feature of the one or more candidates in the first set of candidates exceeds a first feature threshold;

forming a second set of candidates of remaining candidates after the first invalidating;

generating a string identifier with a corresponding confidence level for each license plate in each bounding box by applying the license plate recognition model to the second set of candidates;

second invalidating one or more candidates in the second set of candidates in response to detecting that a second feature of the one or more candidates in the second set of candidates exceeds a second feature threshold;

forming a third set of candidates of remaining candidates after the second invalidating; and generating, based on the third set of candidates, an array of license plate information comprising an image of a license plate from the input image, a corresponding string identifier, corresponding bounding box coordinates, and a corresponding confidence level.

* * * * *

UNITED STATES PATENT AND TRADEMARK OFFICE
CERTIFICATE OF CORRECTION

PATENT NO. : 11,580,753 B2
APPLICATION NO. : 17/317505
DATED : February 14, 2023
INVENTOR(S) : Popov et al.

Page 1 of 1

It is certified that error appears in the above-identified patent and that said Letters Patent is hereby corrected as shown below:

On the Title Page

On page 2, in Column 2, under "U.S. Patent Documents", Line 5, delete "2013/0013631" and insert --2013/0136310-- therefor Signed and Sealed this
Fifth Day of March, 2024

Katherine Kelly Vidal
*Director of the United States Patent and Trademark Office*